2,982,802
ISOMERIZATION OF NORMAL PARAFFINS

Hillis O. Folkins, Crystal Lake, and Elmer L. Miller, Cary, Ill., assignors to The Pure Oil Company, Chicago, Ill., a corporation Ohio No Drawing. Filed Oct. 31, 1957, Ser. No. 693,540

12 Claims. (Cl. 260—683.65)

This invention relates to the isomerization of isomerizable, saturated hydrocarbons having 5 to 8 carbon atoms per molecule. It is more specifically concerned with upgrading the octane number of low-octane-number, low-boiling mixtures of saturated $C_5$–$C_8$ hydrocarbons by hydroisomerization in the presence of a catalyst comprising a major portion of a solid, acidic oxide catalyst base having incorporated therein small amounts of a hydrogenation agent.

In accordance with this invention, it has been found that the selectivity of isomerization catalysts consisting essentially of a major portion of a solid, refractory acidic oxide base, e.g., a silica-alumina hydrocarbon cracking catalyst, and having incorporated therein a small amount of hydrogenation agent employed in the hydroisomerization of isomerizable saturated hydrocarbons having 5–8 carbon atoms per molecule is improved by initially contacting a fresh or regenerated catalyst during the start-up period of the process with a low $H_2$/hydrocarbon mol ratio and thereafter increasing the $H_2$/hydrocarbon ratio until the optimum operating level of $H_2$/hydrocarbon ratio is attained.

Because of the need for upgrading low-octane, low-boiling fractions boiling in the gasoline range to produce high-octane-number blending stocks for the production of high-octane-number gasolines for use as motor fuels in high-compression, high-speed, high-output internal combustion engines, isomerization has become an important unit process for integrated petroleum refining operations. The isomerization reaction is a reversible, first order reaction limited by thermodynamic equilibria and does not take place at any appreciable rate without a catalyst. During the initial commercial development of the isomerization process, Friedel-Crafts-type catalyst, such as anhydrous aluminum chloride plus hydrogen chloride, were used. Although effective as isomerization catalysts, Friedel-Crafts catalysts had concomitant disadvantages, such as corrosiveness, which made their use unsatisfactory for commercial isomerization processes. To overcome the disadvantages of this type of catalyst, a solid catalyst consisting essentially of an acidic oxide support having incorporated therein small amounts of a hydrogenation agent has been developed for effectively carrying out the isomerization of saturated hydrocarbons having 5–8 carbon atoms per molecule. It has been found, however, that in conducting the isomerization reactions over these catalysts, the selectivity may be lower than desired due to the hydrocracking tendency of the catalysts at high conversion levels. If uncontrolled, the hydrocracking reaction results in (1) poor yields of desired products, (2) rapid deterioration in catalytic activity, and (3) inoperability in commercial application because of the exothermic nature of the hydrocracking reaction which produces overheating in the reactor and results, inter alia, in the sintering of the catalyst.

It is, therefore, the primary object of this invention to provide a process for improving the efficiency of the hydroisomerization of saturated isomerizable hydrocarbons having 5–8 carbon atoms per molecule, in the presence of a solid isomerization catalyst consisting essentially of a major portion of a mixed oxides acidic base having incorporated therein small amounts of a hydrogenation agent, by suppressing exothermic side reactions, e.g., hydrocracking, thereby increasing the selectivity for isomerization. This and other objects will become more apparent from the following detailed description of this invention.

In carrying out the isomerization reaction, the operating conditions of temperature and pressure are important because of their influence in processing feed stocks varying in $C_5$–$C_8$ hydrocarbon composition. Another important operating factor is the presence of hydrogen because of its palliative effect in mitigating hydrocracking. It has been found that low $H_2$/hydrocarbon mol ratios are conducive to high conversion, but at these ratios catalyst activity declines rapidly; therefore, lower $H_2$/hydrocarbon ratios are not practical. Similarly, high conversions can be obtained at higher $H_2$/hydrocarbon ratios (greater than 1 molal) by operating under the conditions requisite therefor. Under these conditions, catalyst life is longer and the process can be conducted for longer periods without regeneration of the catalyst. Therefore, it is generally preferred to operate with a $H_2$/hydrocarbon ratio of 1.0 or greater. It has been found, however, that under these conditions the catalyst has a tendency to promote hydrocracking reactions, resulting in poor selectivity. This tendency towards hydrocracking manifests itself particularly when bringing the reactor on stream, and in the early stages of the process period. Since the hydrocracking reaction is exothermic, it causes large local temperature increases, generally in the upper portion of the catalyst bed. Due to this exothermic reaction, large catalytic reactors are difficult to control with respect to temperature. The catalyst activity is also impaired and hence subsequent operation must proceed with less than desired catalytic activity and efficiency. According to this invention, it has been found that the isomerization reaction can be initiated at high selectivity, and without subsequent substantial hydrocracking and resultant temperature rise, by bringing the process on stream in a certain specified manner which consists of initially contacting the catalyst with the hydrocarbon and hydrogen under controlled, low $H_2$/hydrocarbon ratios, and subsequently in a controlled fashion by gradually increasing the $H_2$/hydrocarbon ratio until the desired operating level of $H_2$/hydrocarbon ratio is obtained.

To illustrate the instant invention, a catalyst consisting of 15% nickel molybdate on a silica-alumina support having a nominal 50–50 ratio of silica to alumina was employed in the isomerization start-up processes utilized to illustrate the instant invention. This catalyst was prepared by impregnating 340 grams of an admixture consisting of 65% by weight of a 75/25 $SiO_2$—$Al_2O_3$ cracking catalyst (Oil and Gas Journal, Oct. 17, 1955, at page 121 et seq.) and 35% by weight of an activated alumina (Alorco H–41) with nickel molybdate prepared by admixing an ammoniacal aqueous solution of paramolybdate and a solution of nickel nitrate.

The former solution was prepared by dissolving 48 grams of ammonium heptamolybdate in 300 milliliters of distilled water. To this solution was added 20 milliliters of concentrated ammonium hydroxide and the solution was heated to around 150–180° F. The latter solution of nickel nitrate was prepared by dissolving 88 grams of $Ni(NO_3)_2 \cdot 6H_2O$ in 300 milliliters of distilled water and this solution was added to the ammonium heptamolybdate solution. To this rapidly stirred mixture, at 176° F., 340 grams of the finely divided mixture of 75/25 silica-alumina and H–41 alumina was added slowly. The resultant slurry was stirred for one hour at 176°

F., and then was filtered and the filter cake washed with distilled water. A "green" composite containing 15% NiMoO$_4$ on the silica-alumina support was obtained by drying the washed cake for 16 hours in an oven maintained at 230° F.

To activate the catalyst, 150 milliliters of "green" catalyst, pelleted in ⅛" pellets, was placed in a reactor, and hydrogen was passed over the catalyst at about 4 s.c.f.h. while the temperature was slowly raised to 975° F. over a period of 4 hours, and further reduced at 975° F. for 16 hours. The catalyst was then purged with nitrogen and oxidized air at 975° F. In order to control temperature rise during the oxidation step, air diluted with nitrogen, so that the oxygen content of the oxidizing medium was around 5 percent, was first introduced to the catalyst. As oxidation progressed, the oxygen content was increased and the catalyst was oxidized with air at around 4 s.c.f.h. flow for a period of 1–2 hours. The temperature was then reduced to 800° F. in a flow of air at 4 s.c.f.h. The reactor was then evacuated to remove air from the system and the vacuum was broken with a flow of hydrogen of 4 s.c.f.h. Reduction at 800° F. at reduced pressure was continued for about one hour, the pressure being raised to atmospheric with continued hydrogen flow, and the catalyst was then cooled to reaction temperatures (650–700° F.) in this flow of hydrogen. The system was then brought up to operating pressures with hydrogen, and the hydrocarbon to be processed was charged.

Employing this catalyst, various start-up procedures were investigated with a standard, synthetic, hydrocarbon charge consisting of 80 volume percent of normal alkanes and 20 volume percent of cyclohexane. The alkane portion of the charge stock was prepared by blending equal volumes of normal heptane, normal hexane and normal pentane. The following operating conditions were employed:

Temperature _____° F__ 660
Pressure _____p.s.i.g__ 350
Liquid volume hourly space velocity_____ 1.0

In starting one run, the catalyst was initially contacted with the hydrocarbon charge at a H$_2$/hydrocarbon ratio of 2.0. Hydrocracking developed near the top of the catalyst bed and the temperature at this spot rose to 770° F., at which time the process was interrupted and the reactor cooled down to run conditions. If the run had not been interrupted at this point, temperatures would have risen far beyond 770° F., which would have made the isomerization process inoperable.

In a subsequent isomerization operation, the run was started at a H$_2$/hydrocarbon ratio of 0.5. This ratio was increased to 1.0 three minutes after the charge had contacted the bed, and to 1.8 in another three minutes. At this point the temperature started to rise near the top of the bed and reached a maximum of 700° F., indicating that hot spots and hydrocracking were developing within the catalyst bed. It was, therefore, evident that the H$_2$/hydrocarbon ratio was increased too rapidly to avoid hydrocracking during the start-up period of the isomerization run. In an additional run illustrative of the incident invention, the charge was introduced into the reactor employing an initial H$_2$/hydrocarbon mol ratio of 0.5. As soon as the charge contacted the bed the ratio was increased 0.1 unit per minute until a ratio of 1.0 was reached and then the rate was changed to 0.1 unit per five minutes until a ratio of 2.0 was attained. Using this schedule, no runaway temperatures were observed throughout the rest of the normal isomerization run. This run illustrates the maximum rate of ratio increase consistent with controlling hydrocracking, in accordance with the process of this invention.

The function of low H$_2$/hydrocarbon mol ratios in initially conditioning the catalyst to selective isomerization activity results from the controlled, preferential poisoning of hydrocracking sites at low H$_2$/hydrocarbon concentrations. More prolonged treatment at low ratios will also poison isomerization sites. In general, the conditioning of the catalyst is satisfactory if operations are initiated and continued at low hydrogen/hydrocarbon ratios so that the isomerization conversion is not degenerated beyond 5 conversion units. Less conditioning than this is preferred. Depending upon the inherent selectivity characteristics of the catalysts and upon the charged hydrocarbons, the time required for conditioning the catalysts by low-ratio treatment will vary. In some instances it may be necessary to maintain a low H$_2$/hydrocarbon mol ratio, e.g., 0.25–0.5 for a period of several hours, and then gradually increase the ratio to the desired operating level. In no case, however, should the ratio be maintained at a low level for a time sufficient to degenerate the overall catalytic activity of the catalysts by more than 5 conversion units. The term "conversion" as defined in Chemical Process Principles, 2nd edition, part 1, page 215, by Hougen, Watson, and Ragatz, is defined as "the percentage of the limiting reactant in the combined reactor feed that is converted and disappears." Conversion units as used herein refers to percentage units of conversion. Processing conditions required to precondition the acidic oxide-hydrogenation agent composite catalyst, employed in the hydroisomerization of saturated hydrocarbons having 5–8 carbon atoms per molecule, will depend upon the specific catalyst employed. In general, the initial H$_2$/hydrocarbon ratio used will be about 0.5 but lower ratios on the order of 0.25 or less can be employed for short periods of time. This initial ratio is increased at the rate of about 0.01 to 0.1 unit per minute until a ratio of about 1.0 is attained. If the selected optimum H$_2$/hydrocarbon ratio is at this level, no further increase is effected. Higher ratios, however, are generally preferred. Accordingly, a further increase to the desired operating ratio is employed. In this second step the rate of increase in the H$_2$/hydrocarbon ratio is 0.02 to 0.1 unit per each 5 minutes until operating conditions required for steady run conditions are attained.

Although the foregoing illustrative embodiment of this invention designates a specific silica-alumina/nickel molybdate catalyst composition, it is to be understood that a number of catalyst compositions are receptive to the preconditioning technique carried out in accordance with this invention. Catalysts which can be preconditioned in accordance with this invention are compositions comprising a refractory mixed-oxides base, composited to evince acidic properties and hydrocarbon cracking activity, having incorporated therein a small amount, viz., 0.5 to 20 percent by weight, of a hydrogenation agent. Specific examples of the refractory mixed-oxides base include but are not limited to silica-alumina, silica-zirconia, silica-titania, silica-boria, alumina-zirconia, alumina-beryllia, alumina-boria, silica-chromia, boria-titania, silica-alumina-zirconia, silica-alumina-beryllia, and acid-treated clays. It has been found that catalyst carriers containing 50–87% silica and 50–13% alumina having incorporated therein 0.5 to 15% of the hydrogenation agent have superior activities and are preferred. The hydrogenation agent can be group VIII metals of the iron series, oxides of a polyvalent metal of groups V, VI and VII, or group VIII metal salts of the oxyacids of polyvalent metals of groups V, VI and VII. Specific composite isomerization catalysts which can be employed include the following:

Group VIII metals of the iron series such as nickel, iron or cobalt, can be incorporated on an acidic support such as silica-alumina, silica-zirconia, silica-alumina-zirconia, alumina-boria, etc. The metal promoter content of the resulting catalysts is generally in the range of 0.5 to 8 weight percent, and is preferably in the range of about 1.0 to 5 percent. Other hydrogenation components, such as group VIII metals, Pt, Rh, Pd, etc., can be added in smaller amount as a co-hydrogenation promoter. The amounts of these co-promoters, dictated by economy, and by activity of such, will be present in lesser amounts, generally in the order of 0.01 to 1.0 percent.

Similarly, the group VIII metals of the iron series can be used in admixture with other hydrogenation agents. For example, they can be promoted by the oxides of polyvalent metals of groups V, VI and VII. In catalysts, compositions of the nature of the oxides of chromium, molybdenum, tungsten, manganese and vanadium can be employed as co-promoters. In such cases, the total amount of promoter should be in the range of 0.5 to 15 percent with the group VIII metal not exceeding about 8 percent.

Similarly, group VIII metal salts of oxyacids such as nickel tungstate, nickel molybdate, nickel chromate, cobalt molybdate, nickel phosphate, etc., can be employed in the preparation of these catalysts. In such cases, the range of concentration of hydrogenation component should be on the approximate order of 1 to 15 with the provision that the group VIII metal content should not exceed about 8 percent.

Specific catalysts which have proved adaptable to this invention include:

5% Ni on 87/13 silica-alumina base
1.5% Ni on 87/13 silica-alumina base
5% Ni on 75/25 silica-alumina base
5% Ni on 90/10 silica zirconia base
10% $NiMoO_4$ (2.7 Ni, 4.4% Mo) on 75/25 silica-alumina
15% $NiMoO_4$ (4.1, 6.7% Mo) on 50/50 silica-alumina
10% nickel tungstate on 75/25 silica-alumina
10% nickel chromate on 75/25 silica-alumina
5% nickel+1.0 Co on 75/25 silica-alumina.

In preparing the acidic-oxide-hydrogenation agent composite isomerization catalyst, preconditioned in accordance with this invention, conventional methods can be used. Impregnation is a common method used for the incorporation of the active component on the support. This procedure generally involves contacting the support with a solution of a salt or a compound which upon heating will decompose to give the desired component. The excess solution is removed and the slurry is dried and calcined to produce a "green" catalyst which is subsequently activated. Precepitation techniques can also be employed where the catalyst includes more than one component. In multi-component catalysts many variations of this method are employed, such as gel formation, co-precipitation, or a combination of precipitation with other methods. In carrying out this procedure, an aqous salt solution containing the required component is used to impregnate a solid support. The slurry is then contacted with a suitable precipitating agent to provide an admixture of the desired promoter incorporated in the base material. As in the impregnation technique, the resulting slurry is dried to produce a "green" catalyst which is subsequently activated. Another technique, which is not as widely used as the foregoing precipitation or impregnation method, is the so-called wet-and-dry-mixing method which is usually employed to prepare pre-formed catalysts such as pellets or extrusions. In activating these catalysts a variety of activation techniques are utilized in order to reduce the reducible components of the catalyst composition to their lowest state of valency under the reducing conditions employed. The desired reduction can be carried out by a simple contacting of the "green" catalyst with a reducing compound or fluid at an elevated temperature. Other techniques involve a two-step activation technique involving an oxidation-reduction cycle.

While this specific method was employed in activating the instant catalyst, other methods can be employed. Thus the catalyst can be activated by decomposition in hydrogen at temperatures to 975°, and cooled in hydrogen to operating conditions followed by pressurizing with hydrogen and introduction of the hydrocarbons. Similarly, the catalyst can be activated by decomposition and reduction in hydrogen at temperatures to around 975° F. followed by an oxidation-reduction treatment at that temperature.

After the catalyst has been preconditioned, either in situ in the reactor ready for use, or in a separate preconditioning zone after which the catalyst is transferred to a reaction zone, the feed stock is introduced into the catalyst zone and isomerized employing operating conditions within the following range:

|  | Range | Preferred Range |
| --- | --- | --- |
| Temperature, °F | 600–750 | 650–700 |
| Pressure p.s.i.g | 50–1,000 | 300–500 |
| $H_2$/hydrocarbon mol ratio | 1–10 | 2–4 |
| Liquid hourly volume space volume (LVHSV) | 0.1–4.0 | 0.5–2.0 |

Feed stocks which are processed in the isomerization process of this invention consist of saturated hydrocarbons having 5–8 atoms per molecule.

The feed stock can consist of either pure hydrocarbons or mixtures of such, or it can consist of naturally-occurring mixtures of hydrocarbons, such as natural gasolines or low-boiling distillates having a boiling range of about 85° to 250° F., fractionated from a full-boiling-range, straight-run gasoline. It may be preferred to process stocks of narrower boiling range. Thus a typical $C_5$–$C_6$ natural gasoline used in this processing contained around 38 percent pentanes, 48 percent hexanes, 5 percent benzene, and 9 percent $C_6$-naphthenes. Similarly, a $C_7$ fraction of the same naphtha, depending upon precision of fractionation, will contain a mixture of $C_6$ and $C_7$ hydrocarbons. A typical stock showed the following approximate composition: hexanes and lighter, 7 percent; benzene, 2 percent; heptanes, 63 percent; $C_6$-naphthenes, 19 percent; and $C_7$-naphthenes, 9 percent by weight. Because of the relatively mild conditions employed, any naphthenes which are contained in the feed stock are not dehydrogenated but are isomerized to other naphthene hydrocarbon, molecular configurations. For example, cyclohexane is isomerized to methylcyclopentane instead of being converted to benzene by dehydrogenation.

Although the foregoing remarks are directed primarily to the use of a freshly-prepared catalyst, it is to be understood that start-up procedure of this invention for improving the efficiency of an isomerization process can also be used in starting up an isomerization process subsequent to the regeneration of a spent acidic-oxide-base, hydrogenation-agent composite where in the regeneration process the catalyst is subsequently activated by reducing the catalyst to its lowest state of valency at the conditions of reduction employed.

It is apparent from the foregoing discussion that variations or modifications can be made by those skilled in the art without departing from the spirit of this invention. Various manipulative isomerization techniques can be employed wherein the isomerization catalyst is preconditioned in accordance with the instant invention. It is, therefore, intended that the instant invention be limited only as specifically set forth in the appended claims.

We claim as our invention:

1. In a process for the isomerization of n-$C_5$–$C_8$ paraffin hydrocarbons which comprises contacting a mixture of hydrogen and n-$C_5$–$C_8$ paraffin hydrocarbon feed at an elevated pressure, a $H_2$/hydrocarbon feed mol ratio in the range from about 1:1 to 10:1, at a temperature of about 600°–750° F., with a catalyst consisting essentially of an acidic refractory mixed-oxides support and 0.5–20% wt. of at least one hydrogenation agent selected from the group consisting of iron group metals, group V, VI, and VII metal oxides, and iron group metal salts of oxyacids of group V, VI, and VII metals; a method of mitigating hydrocracking during start-up of the process which comprises initiating the flow of hydrogen and hydrocarbon feed under isomerization conditions of temperature and pressure, at a $H_2$/hydrocarbon feed mol ratio of substantially less than the optimum ratio for a time sufficient to degenerate the catalyst activity by a small amount not in excess of 5 conversion units, and thereafter slowly increasing the $H_2$/hydrocarbon feed mol ratio until the desired optimum ratio in the range from about 1:1 to 10:1 is reached for the selected process conditions of temperature and pressure.

2. A process according to claim 1 in which the support consists of silica-alumina containing 50–87% silica.

3. A process according to claim 1 in which the initial $H_2$/hydrocarbon feed ratio is within the range of about 0.25–0.5 and the ratio is increased at a rate of 0.01–0.1 unit of mol ratio per minute until a mol ratio of 1 is reached.

4. A process according to claim 1 in which the optimum $H_2$/hydrocarbon feed mol ratio is about 2–4:1, the initial mol ratio is about 0.25–0.5, the ratio is increased at a rate of 0.01–0.1 unit of mol ratio until a mol ratio of 1 is reached, and thereafter at a rate of 0.2–0.1 unit of mol ratio per 5 minutes until the desired optimum mol ratio is reached.

5. A process according to claim 4 in which the support consists of silica-alumina containing 50–87% silica.

6. A process according to claim 4 in which the initial mol ratio is 0.5.

7. A process according to claim 1 in which the catalyst consists essentially of an acidic refractory mixed-oxides support containing 0.5–20% wt. of a nickel-containing hydrogenation agent.

8. A process according to claim 3 in which the catalyst consists essentially of an acidic refractory mixed-oxides support containing 0.5–20% wt. of a nickel-containing hydrogenation agent.

9. A process according to claim 4 in which the catalyst consists essentially of an acidic refractory mixed-oxides support containing 0.5–20% wt. of a nickel-containing hydrogenation agent.

10. A process according to claim 4 in which the catalyst consists essentially of 50–87/50–13 silica-alumina, containing 0.5–20% wt. of a nickel-containing hydrogenation agent.

11. A process according to claim 6 in which the catalyst consists essentially of 50–87/50–13 silica-alumina, containing 0.5–20% wt. of a nickel-containing hydrogenation agent.

12. A process according to claim 1 in which the catalyst consists essentially of 50/50 silica-alumina containing 15% wt. reduced nickel molybdate, the optimum $H_2$/hydrocarbon feed mol ratio is 2–4:1, the initial mol ratio is 0.5, the ratio is increased at the rate of 0.1 unit per minute until a ratio of about 1 is reached, and thereafter at the rate of 0.1 unit per 5 minutes until the desired optimum mol ratio is reached.

References Cited in the file of this patent

UNITED STATES PATENTS

| | | |
|---|---|---|
| 2,550,531 | Ciapetta | Apr. 24, 1951 |
| 2,902,434 | Burton et al. | Sept. 1, 1959 |

FOREIGN PATENTS

| | | |
|---|---|---|
| 487,392 | Canada | Oct. 21, 1952 |

UNITED STATES PATENT OFFICE
CERTIFICATE OF CORRECTION

Patent No. 2,982,802            May 2, 1961

Hillis O. Folkins et al.

It is hereby certified that error appears in the above numbered patent requiring correction and that the said Letters Patent should read as corrected below.

Column 3, line 12, after "oxidized" insert -- with --; column 5, line 18, after "15" insert -- percent --; line 49, for "aquous" read -- aqueous --; column 6, line 22, after "5-8" insert -- carbon --.

Signed and sealed this 10th day of October 1961.

(SEAL)
Attest:

ERNEST W. SWIDER            DAVID L. LADD
Attesting Officer            Commissioner of Patents

USCOMM-DC